United States Patent [19]
Casaro

[11] Patent Number: 5,833,374
[45] Date of Patent: Nov. 10, 1998

[54] ROTATABLE ASSEMBLY FOR SUPPORTING OF THE ROTOR OF A VACUUM PUMP

[75] Inventor: Fausto Casaro, Torino, Italy

[73] Assignee: Varian Associates, Inc., Palo Alto, Calif.

[21] Appl. No.: 858,230

[22] Filed: May 19, 1997

[51] Int. Cl.$^6$ .................................................... F16C 19/08

[52] U.S. Cl. ............................ 384/537; 384/543; 384/551

[58] Field of Search ..................... 384/537, 543, 384/551, 569, 275

[56] References Cited

U.S. PATENT DOCUMENTS

| | | | |
|---|---|---|---|
| 3,969,042 | 7/1976 | Bachler | 384/109 |
| 3,993,164 | 11/1976 | Brown | 384/100 |
| 4,869,626 | 9/1989 | Veronesi et al. | 384/306 |

*Primary Examiner*—Lenard A. Footland
*Attorney, Agent, or Firm*—Bella Fishman

[57] ABSTRACT

A rotatable assembly for supporting the rotor of a vacuum pump with a plurality of gas pumping stages formed by cooperating rotor discs secured to the rotor and stator rings integral with a body, comprising rotatable means for supporting the shaft of the rotor that are housed within this shaft.

4 Claims, 4 Drawing Sheets

ROTATABLE ASSEMBLY FOR SUPPORTING OF THE ROTOR OF A VACUUM PUMP

FIELD OF THE INVENTION

The present invention is directed to a bearing assembly for rotatably supporting a rotor of a vacuum pump, and more particularly the invention relates to a bearing assembly for supporting the shaft of a rotor in a vacuum pump of the turbomolecular type.

BACKGROUND OF THE INVENTION

As it is known in the art, a vacuum pump is substantially formed by an outer case housing a number of gas pumping stages. The gas pumping stages generally comprise a plurality of stator rings integral with the pump body and cooperating with a plurality of rotor disks integrally mounted on a rotatable shaft rotated by a pump motor. The pumping stages provide a region for the gas passage, known as a pumping channel, in which the surfaces of a rotor disk and of the corresponding stator disk are relatively spaced apart, and high tightness zones in which the surface of a rotor and that of the corresponding stator disk are very close to each other. The rotor disks can be formed of flat disks or disks provided with a number of tilted and closely spaced vanes.

A vacuum pump of the turbomolecular type comprises both flat disks and disks equipped with vanes and is capable to achieve vacuum levels in the order of $10^{-8}$ Pa.

In order to reach such vacuum levels, in the presently employed pumps the rotor has to be driven at speeds near to 100,000 rpm and not lower than 25,000 rpm.

An example of vacuum pump of turbomolecular type is disclosed in details in the U.S. Pat. No. 5,238,362, entitled TURBO MOLECULAR PUMP, assigned to the Assignee of the present invention. It is further well known using bearings for rotatably supporting the shaft of the rotor in a vacuum pump.

With reference to FIGS. 5a, that schematically illustrates an arrangement according to the prior art, shaft 1 of a vacuum pump is rotatably supported through a pair of rotatable supports or bearings 2 and 3, for example ball bearings, disposed between shaft 1 and body 7 of the vacuum pump. FIG. 5a illustrates an embodiment of the prior art in which both bearings 2 and 3 are located on the same side of the pump with respect to pump rotor 4 that is integral with the rotatable shaft 1.

FIG. 5b illustrates another embodiment of the prior art in which the bearings 2 and 5 are located at the opposed ends of pump rotor 4 that is integral with the rotatable shaft 1.

In FIGS. 5a and 5b the arrow 6 shows the inlet direction of the gas into the pump.

It is further known using turbomolecular pumps in the field of integrated circuits manufacturing. In the manufacturing of integrated circuits there are employed gas mixtures such as, for example, HCl, HBr, $Cl_2$, $F_2$, $NH_3$, that are corrosive, as it is well known.

One of the main drawbacks arising in the use of turbomolecular pumps in the manufacturing of integrated circuits causes by the fact that a not negligible amount of the gas is being accumulated by diffusion through the pumping stages. As a consequence, the surfaces of the pump internal components, and mainly the rotor bearings, are directly exposed to the corrosive attack of the above mentioned gas mixtures.

Therefore in order to prevent a quick damaging of the turbomolecular pumps used in the above applications, it has been necessary to provide especially designed pumps capable to withstand corrosive environments that are known as corrosion-resistant or "CP" (Corrosion Proof) pumps.

In the above mentioned type of pumps a flow of inert gas is forced into the space housing the bearings to set up a barrier preventing the entrance of corrosive substances that are produced in the integrated circuits manufacturing process.

It is therefore a main object of the present invention to provide an additional protective barrier against the corrosive action on the bearings of the rotor shaft by the gases on which the pump operates.

As an alternative to the mechanical bearings, it is further known the use of magnetic bearings as rotatable supports for the shaft of a vacuum pump. The use of magnetic bearings for rotatably supporting the shaft of a turbomolecular pump has however the drawback since it requests a constant electric feeding of the magnetic bearings during the rotation of the pump.

If the electric power supply fails, during the rotation of the pump rotor then the magnetic bearings rotatably supporting the shaft thereof would be abruptly deenergized. As a consequence the pump rotor would tend to its rest condition when rotating at its maximum speed, which is over 25,000 rpm as already mentioned, causing the breaking of the rotor bearings.

To prevent the breaking of the rotor supporting members, a battery and/or system are conventionally used for converting the rotor kinetic energy into electric energy to feed the magnetic bearings until the pump rotor is stopped even without a power supply from the mains.

However these solutions are complex and expensive both to be installed and to be processed. Moreover they do not provide enough reliability, for example, against a lack of power supply due to a fault in the feeding cables.

In conventional pump's design auxiliary mechanical bearings are for preventing the breaking of the bearings that intervene only in conditions such as an excessive applied load, a malfunction of the magnetic bearings, or when these latter are no longer fed, or similar conditions.

The auxiliary bearings are commonly known as emergency or "backup" bearings and are generally positioned in accordance with the arrangements show in FIGS. 5a and 5b, leaving a gap between the rotatable ring of the backup supports and the rotor of the pump.

Such a gap allows for free rotation of the pump rotor when the magnetic bearings are working without interfering with the backup bearings. The choice of these backup bearings is however particularly critical when the rotor of the pump rotates at a very high speed.

Upon the intervention of the backup bearings the sudden contact between the surfaces rotating at an extremely high speed with stationary ones imparts high loading and very high accelerations to the rotating bodies, and generates a very large power dissipation that can cause a seizure between the mutually moving parts.

In order to overcome at least partially these drawbacks it is preferable to use backup bearings having a small size. This can be important, for example, in the embodiment shown in FIG. 5b where one of the two bearings is housed in the rotor of the vacuum pump. However, this known approach only partially solves the above referenced problem and brings about the additional disadvantage of requiring a complex system for securing the bearing located within the rotor that partially obstructs the pump suction inlet from which the gas to be pumped is admitted, as shown by arrow 6 in FIG. 5b. Moreover, even when such backup bearing positioned on the inlet side of the pump is not lubricated, it can pollute the volume to be pumped with dust and particles from the pump components' wear.

Another drawback of this solution comes from the fact that the backup bearing which is located on the pump side facing the volume to be pumped is highly exposed to the action of possible corrosive gases employed in the process so that it is quickly damaged by them.

It is therefore another object of the present invention to provide small-size auxiliary bearings that are free from the above described disadvantages.

SUMMARY OF THE INVENTION

In accordance with the present invention, there is provided a vacuum pump with a bearing assembly for supporting a rotor of the vacuum pumps. The rotor of the pump comprises a hollow rotatable shaft wherein rotatable supporting means disposed within this shaft.

According to one embodiment of the present invention, a bearing assembly has a supporting journal which is an integral with a body of the vacuum pump and substantially coaxial with the shaft, and blocking sleeve collars. Blocking sleeve collars maintain rotatable supporting means on the supporting journal. A stiffening sleeve may be interposed between the rotatable supporting means. The axially restraining rings which are disposed within the hollow shaft may be utilized for proper placing the rotatable supporting means with respect to the shaft.

According to another embodiment of the present invention, a bearing assembly for supporting a rotor of a vacuum pump comprises a hollow shaft, magnetic rotatable means for supporting the shaft and auxiliary mechanical rotatable means which are placed within the shaft. The mechanical bearing assembly, even for main supports, may further comprise axial preloading means which are disposed adjacent to the auxiliary mechanical rotatable means. Axial preloading means and auxiliary mechanical rotatable means are formed of ball or roller bearings and mounted on a pump side that is opposed to an inlet side of a gas to be pumped.

The bearing assembly of the present invention is particularly applicable for turbomolecular pumps.

Further characteristics and advantages of the invention will be better understood from the following description of a preferred but non exclusive embodiment of the invention, only illustrated in the accompanying drawings.

DESCRIPTION OF THE PREFERRED EMBODIMENTS

Figure 1A:
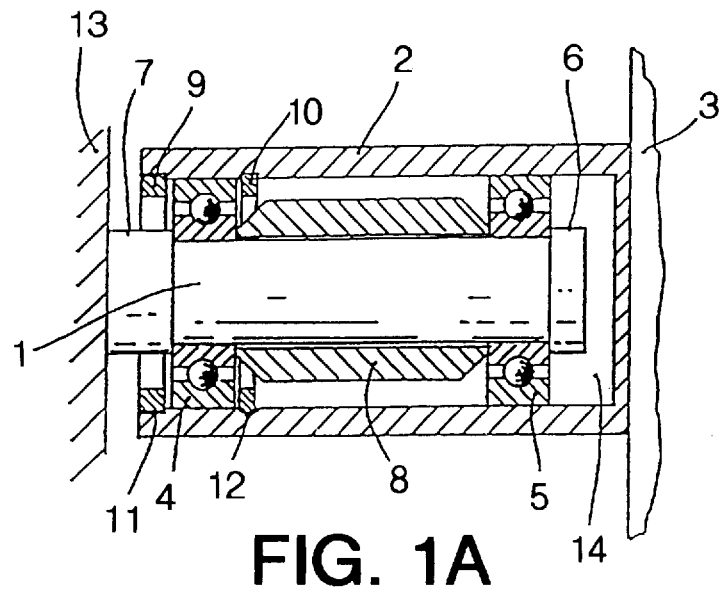
FIG. 1a is a partial sectional view of a vacuum pump illustrating the positioning of the rotatable bearings in accordance with a first embodiment of the present invention.

With reference to FIG. 1a a rotatable bearing assembly according to the present invention comprises journal member 1, removably secured to base 13 of the body of a vacuum pump and surrounded by rotatable hollow shaft 2 having a substantially cylindrical inner cavity 14, to which rotor 3 (only partially shown in the FIG. 1a) is firmly secured, and a pair of ball, or roller bearings 4 and 5 interposed between journal member 1 and the inner surface of the cylindrical cavity 14 of rotatable hollow shaft 2 housing journal member 1.

Bearings 4 and 5 are kept in the desired position on the supporting journal 1 by two sleeve collars 6 and 7, fastened at the opposed ends of journal member 1, near the closed end and the open end or base of rotatable hollow shaft 2, respectively, and by sleeve 8 positioned between bearings 4 and 5.

Sleeve 8 is used for strengthening and stiffening journal member 1 to prevent an excessive bending thereof that might bring rotatable hollow shaft 2 and rotor 3 in contact with the pump's stationary parts.

Axially restraining rings 9 and 10 are further provided that are partially housed in annular radial grooves 11 and 12 of the inner cavity of rotatable hollow shaft 2 of the vacuum pump.

The axially restraining rings 9 and 10 prevent the disengagement of hollow shaft 2 from the journal member 1 when this latter is rotated with respect to the former.

Figure 1B:
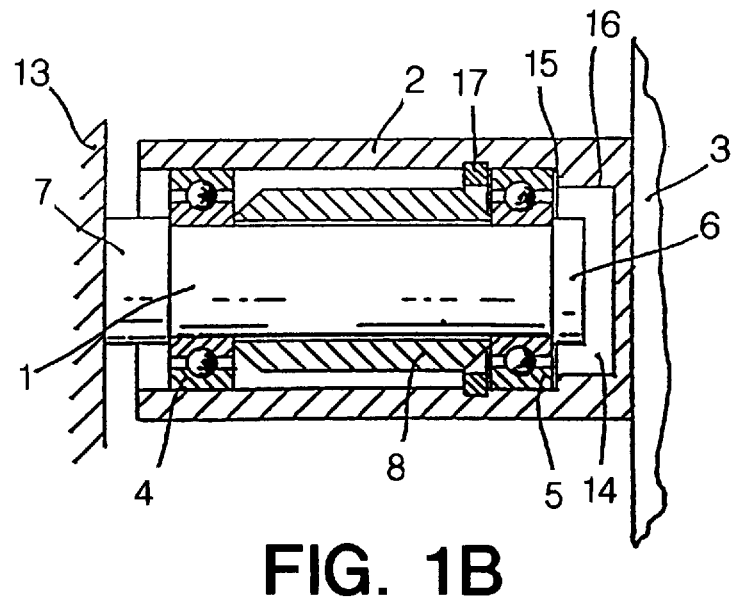
FIG. 1b is a partial sectional view of a vacuum pump illustrating the positioning of the rotatable bearings in accordance with a second embodiment of the present invention.

With reference to FIG. 1b, there is shown another embodiment of the bearing assembly of the present invention in which the cylindrical cross-section of inner cavity 14 in rotatable hollow shaft 2 provided with a reduced diameter portion 16 at the cavity end adjacent to the free end of the journal member 1 thus forming an abutting step or shoulder 15 for ball bearing 5.

In the embodiment of FIG. 1b the axial restraint of rotatable hollow shaft 2 with respect to journal member 1 is obtained through the cooperation between shoulder 15 and single restraining ring 17 that is partially received in an annular radial groove provided within the cylindrical cavity of rotatable hollow shaft 2.

Figure 2A:
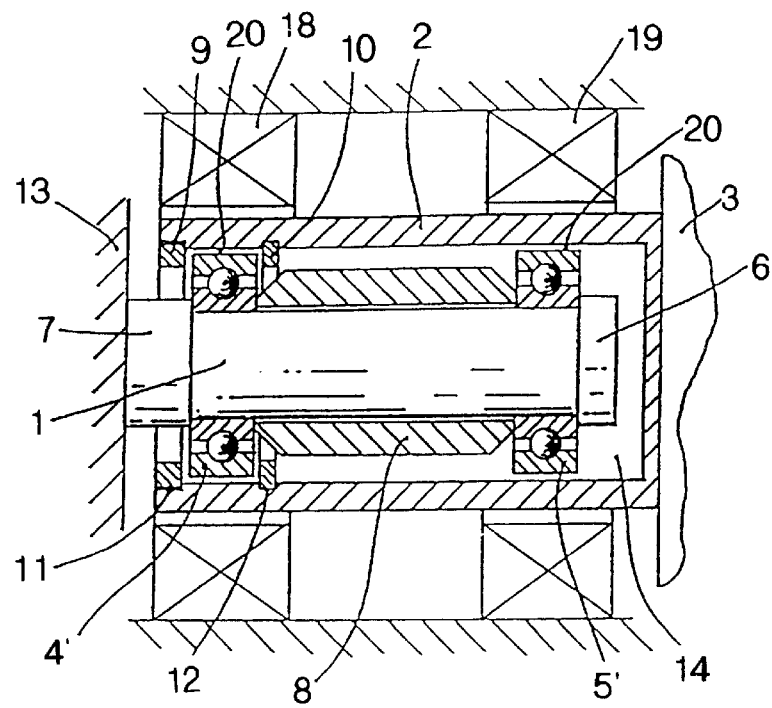
FIG. 2a is a partial sectional view of a vacuum pump illustrating the positioning of the rotatable bearings in accordance with a third embodiment of the present invention.
Figure 2B:
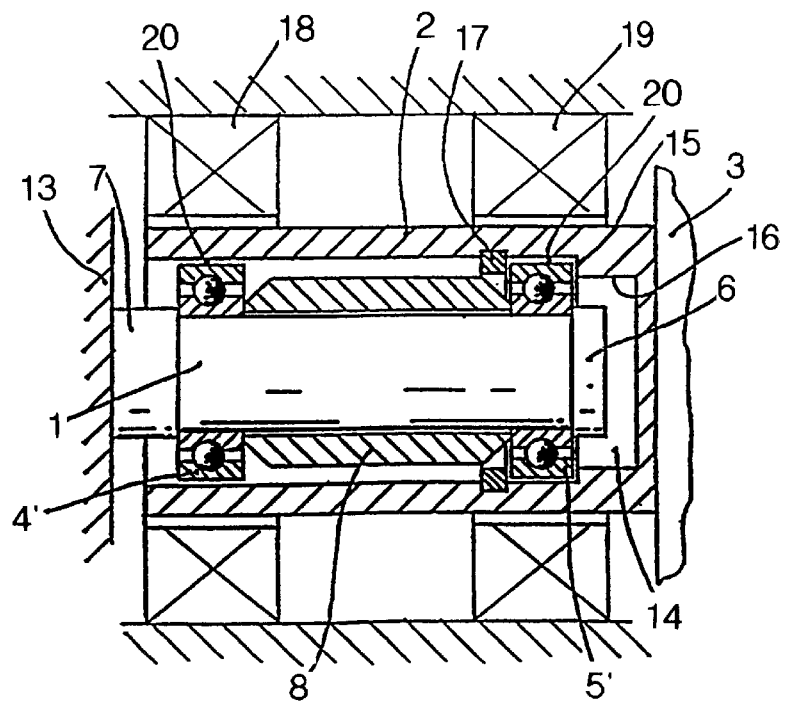
FIG. 2b is a partial sectional view of a vacuum pump illustrating the positioning of the rotatable bearings in accordance with a fourth embodiment of the present invention.

FIGS. 2a and 2b show further embodiments of the bearing assembly of the present invention in which the main means for rotatably and auxiliary supporting hollow shaft 2 comprises magnetic bearings and mechanical bearings. In FIGS. 2a the magnetic bearings are labeled as 18 and 19, and the mechanical bearings assembly are labeled as 4' and 5'.

In the embodiments shown in FIGS. 2a and 2b, gap 20 is formed between auxiliary bearings 4' and 5' and hollow shaft 2 for allowing an unhindered rotation of the hollow shaft 2 with respect of auxiliary bearings 4' and 5' when the main magnetic bearings 18 and 19 are operating, while allowing the contact of the inner surface of inner cavity 14 of hollow shaft 2 with auxiliary bearings 4' and 5' in case of failure of the magnetic bearings 18 and 19 or when they are subjected to an excessive load.

Figure 3:
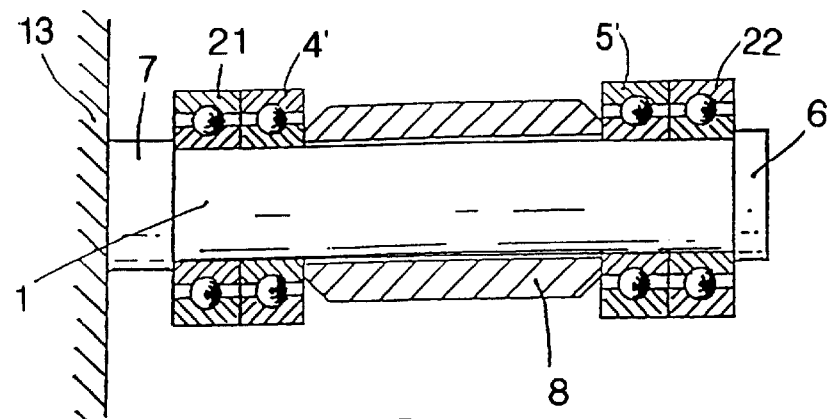
FIG. 3 is a partial sectional view of a vacuum pump illustrating the positioning of the rotatable bearings in accordance with a fifth embodiment of the present invention.

FIG. 3 illustrates a further embodiment of the invention in which the bearings 4' and 5' are coupled with the bearings 21 and 22, respectively, in order to obtain an axial preloading.

The axial preloading of the auxiliary bearings 4' and 5' is useful both for a more precise restraint of the rotor in case of contact with auxiliary bearings 4' and 5' and for preventing a damage of auxiliary bearings 4' and 5' because of the position that the rolling members could take with respect to the rolling races.

Figure 4A:
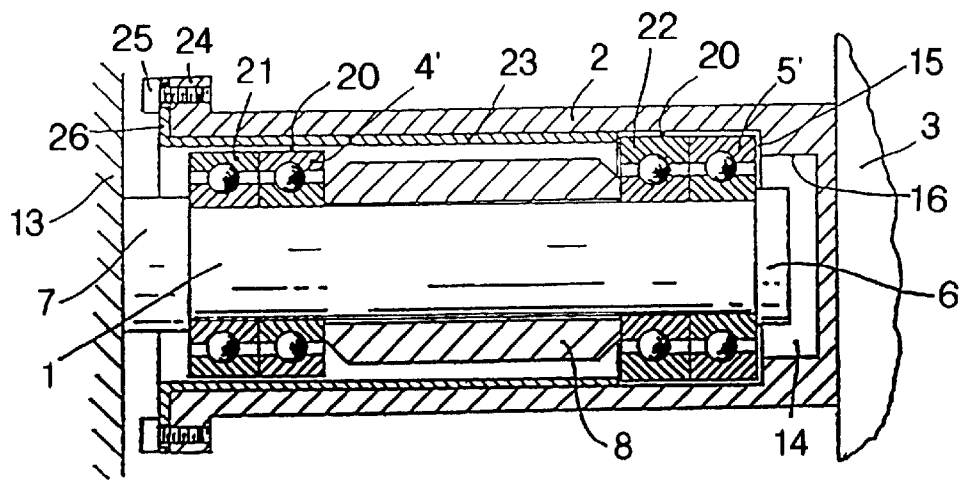
FIG. 4a is a partial sectional view of a vacuum pump illustrating the axial restraining means in accordance with one embodiment of the present invention.
Figure 4B:
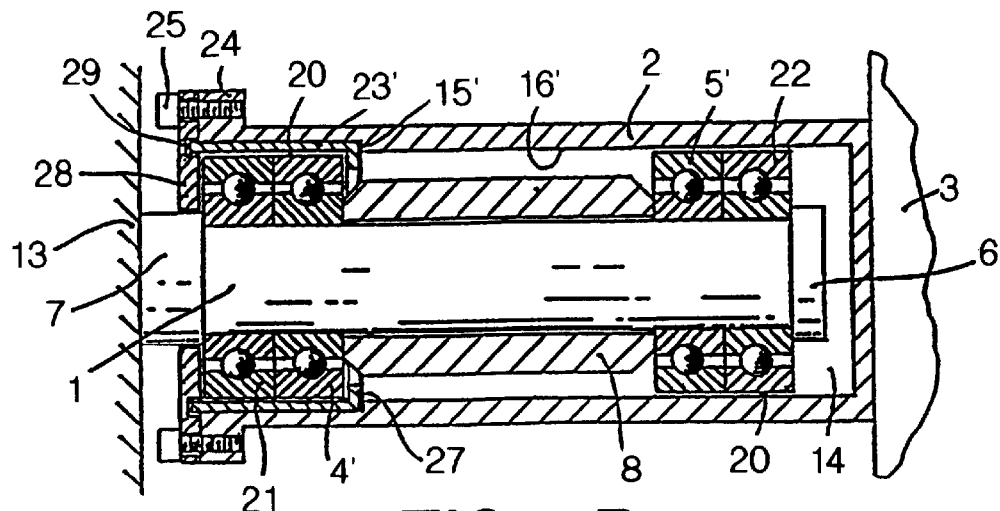
FIG. 4b is a partial sectional view of a vacuum pump illustrating the axial restraining means in accordance with another embodiment of the present invention.
Figure 4C:
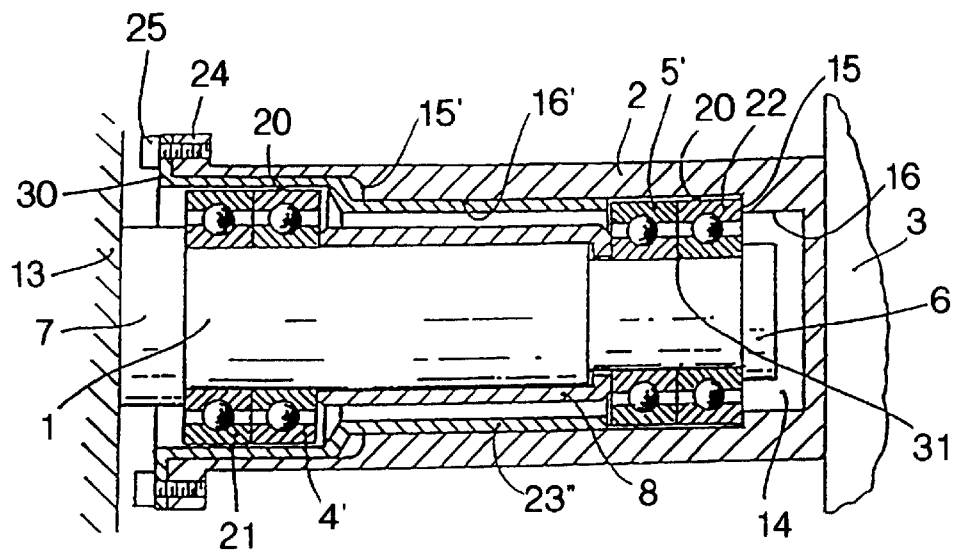
FIG. 4c is a partial sectional view of a vacuum pump illustrating the axial restraining means in accordance with yet another embodiment of the present invention.
Figure 5A:
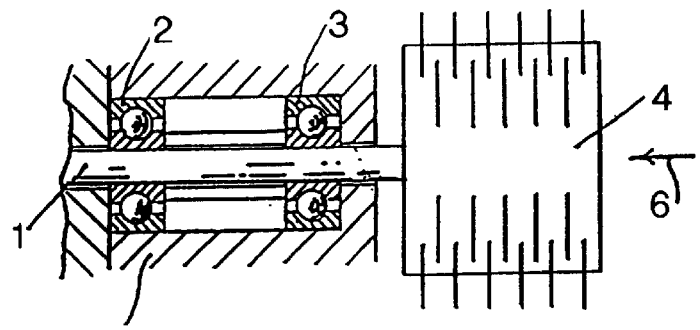
FIG. 5a is a partial sectional view of a vacuum pump illustrating the positioning of the rotatable bearings in accordance with one embodiment of the prior art.
Figure 5B:
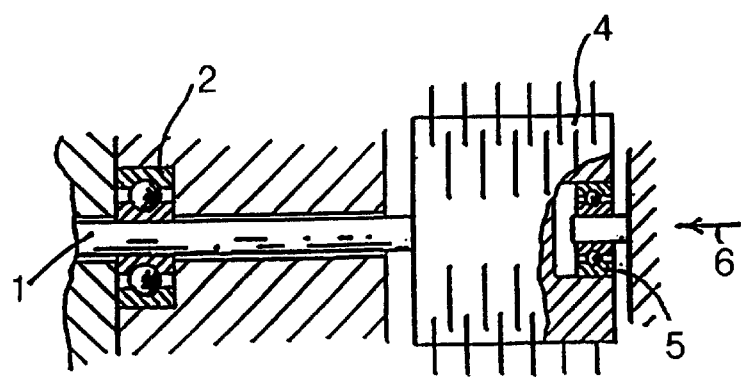
FIG. 5b is a partial sectional view of a vacuum pump illustrating the positioning of the rotatable bearings in accordance with another embodiment of the prior art.

With reference to FIGS. 4a, 4b and 4c there are illustrated three embodiments of axial restraining means provided for preventing the withdrawal of rotatable hollow shaft 2 from journal member 1.

The embodiments illustrated in FIGS. 4a, 4b and 4c relate to arrangements in which the bearings 4' and 5' operate as auxiliary bearings and are provided with an axial preloading, as in the embodiment of FIG. 3. However, the arrangements of FIG. 4a, 4b and 4c can be used also in embodiments that do not provide an axial preloading and/or in which such bearings constitute the main supports of the pump shaft.

More particularly, FIG. 4a illustrates one embodiment of the axial restraining means provided with cylindrical sleeve 23, located in inner cavity 14 of rotatable hollow shaft 2 between the outermost pair of bearings 4', 21 and rotatable hollow shaft 2 of the vacuum pump.

The free end of cylindrical sleeve 23, located within inner cavity 14 of rotatable hollow shaft 2, defines an axial stop shoulder to the innermost pair of bearings 5', 22 that prevents the withdrawal of rotatable hollow shaft 2 from the journal member 1 carrying the bearings 4', 21, 5' and 22.

Moreover, the free end of cylindrical sleeve 23 that protrudes outside hollow shaft 2 has rim 26 outwardly folded at 90° through which pass screws 25 for firmly fastening rim 26 to reinforcing rim 24 formed on the base of hollow shaft 2.

FIG. 4b illustrates another embodiment of the axial restraining means in which narrow portion 16' of inner cavity 14 of hollow shaft 2 is located near the outermost (pair of) bearings 21 and 4', narrow portion 16' defining an abutment step 15' for cylindrical sleeve 23' located within inner cavity 14 of hollow shaft 2 between the bearings 4' and 21 and hollow shaft 2 of the vacuum pump. The free end of cylindrical sleeve 23' located within inner cavity 14, has rim 27 inwardly folded at 90° and defining an axial stop shoulder for the outermost bearings 4' and 21.

Cap 28, fixed by screws 25 to the reinforcing rim 24 provided on the base of hollow shaft 2, firmly presses cylindrical sleeve 23' against the step formed by shoulder 15' of inner cavity 14 of hollow shaft 2 and prevents the withdrawal of hollow shaft 2 from journal member 1 on which there are mounted the bearings 4', 21, 5' and 22.

The surface of cap 28 pressing cylindrical sleeve 23' is further provided with a circular groove 29 for receiving the free end of said cylindrical sleeve 23'.

FIG. 4c illustrates yet another embodiment of the axial restraining means in which the inner cavity 14 of shaft 2 has a first narrow portion 16 and a second narrow portion 16' positioned at the innermost bearings 5' and 22 and at the outermost bearings 4' and 21, respectively, and defining abutment steps 15 and 15', respectively.

Cylindrical sleeve 23", having a front portion with a small cross-section and a rear portion with a larger cross-section enters inner cavity 14 of hollow shaft 2 between bearings 4', 21 and hollow shaft 2 of the vacuum pump.

With its free end located within inner cavity 14 of hollow shaft 2, such cylindrical sleeve 23" defines an axial stop shoulder for the innermost bearings 5', 22 preventing the withdrawal of shaft 2 from supporting journal member 1 on which there are mounted bearings 4', 21, 5' and 22.

At the free end remaining outside hollow shaft 2 such cylindrical sleeve 23" is further provided with rim 30 outwardly folded at 90°, through which pass screws 25 firmly securing rim 30 to reinforcement rim 24 provided on the base of shaft 2.

When the bearings 4', 21, 5' and 22 are used as auxiliary supports, as it is illustrated in FIGS. 4a, 4b and 4c, gap 20 is provided between the moving parts and the bearings 4', 21, 5' and 22 for allowing the free rotation of hollow shaft 2 with respect to the auxiliary bearings when the main magnetic supports are operating.

The embodiment of FIG. 4c where the rear portion having a larger cross-section than the cylindrical sleeve 23" is housed in the portion of inner cavity 14 of shaft 2 having a larger diameter, allows the mounting of larger size outer bearings 4' and 21, in respect of the embodiment illustrated in FIG. 4a, without requiring a thinner supporting journal member 1 that would make weaker the area at which the supporting journal member 1 is fixed to the body of the vacuum pump.

Still with reference to the embodiment illustrated in FIG. 4c, the free end of the supporting journal member 1 can have narrow portion 31 on which there are mounted innermost bearings 5' and 22 having the same or a smaller size than the outermost bearings.

Based on the solutions of the present invention the mechanical supports, both main or auxiliary supports, can have a smaller size compared to the conventional designs, and since they are housed within the rotor shaft, they are kept separated from the pump zones where flows the gas to be pumped, so that they are protected against the gas corrosive action.

Any particles produced by the wearing of the mechanical bearings, either main or auxiliary, are in turn kept separated from the pumped volume.

A further advantage of the present invention is a rotor shaft design. Since the rotor shaft is partially hollow, it exhibits a larger flexural stiffness and a smaller mass that increase the flexural stiffness/mass ratio as it is often useful for quick rotating rotors.

The maintenance of the vacuum pump utilizing the present invention is less time consuming since the supporting journal on which the bearings are mounted can easily be replaced by withdrawing it from the rotor shaft of the pump without any need of disassembling the shaft.

Moreover a more efficient heat dissipation is obtained by positioning the supporting journal on the base of the pump on that side that is opposed to the suction inlet side.

What is claimed is:

1. A bearing assembly for supporting a rotor of a vacuum pump, said vacuum pump comprising a plurality of gas pumping stages formed by rotor disks integral with said rotor and stator rings integral with a body of said vacuum pump, said bearing assembly comprising:

a hollow shaft of said rotor forming a cavity therein, said hollow shaft having a predetermined radial dimension;

a supporting journal disposed within said cavity, said supporting journal being integral with said body of the vacuum pump and substantially coaxial with said hollow shaft;

a pair of spaced apart bearing units disposed between an outer lateral surface of said supporting journal and an inner lateral surface of said hollow shaft, one bearing unit of said spaced apart bearing units mounted proximate to said rotor and another bearing unit of said spaced apart bearing units mounted distal to said rotor;

a stiffening sleeve placed between said spaced apart bearing units; and at least one blocking sleeve collar being adjacent to each said bearing unit for maintaining said each bearing unit between said blocking sleeve collar and stiffening sleeve on said supporting journal.

2. The bearing assembly of claim 1, wherein each said bearing unit comprises at least one ball bearing or roller bearing.

3. The bearing assembly of claim 2, further comprising an axial restraining means in contact with one of said pair of spaced apart bearing units for preventing a disengagement of said hollow shaft from said journal member.

4. The bearing assembly of claim 3, wherein said axial restraining means is in contact with said bearing unit proximate to said rotor and further comprising an axial restraining ring which is partially housed within a radial annular groove in said inner lateral surface of said hollow shaft, and spaced apart therefrom a stepped portion of said hollow shaft, said stepped portion is formed by an end portion of said hollow shaft proximate to said rotor and having a reduced radial dimension relative to said predetermined radial dimension, said bearing unit proximate to said rotor is disposed between said axial restraining ring and said stepped portion of said hollow shaft, whereby in operation restraint of relative axial motion of said hollow shaft and said journal member is provided via cooperation of said one bearing unit proximate to said rotor with said stepped portion and said restraining ring.

* * * * *